(No Model.)
F. MOREY.
ORE CRUSHING MACHINE.
No. 274,215.  Patented Mar. 20, 1883.
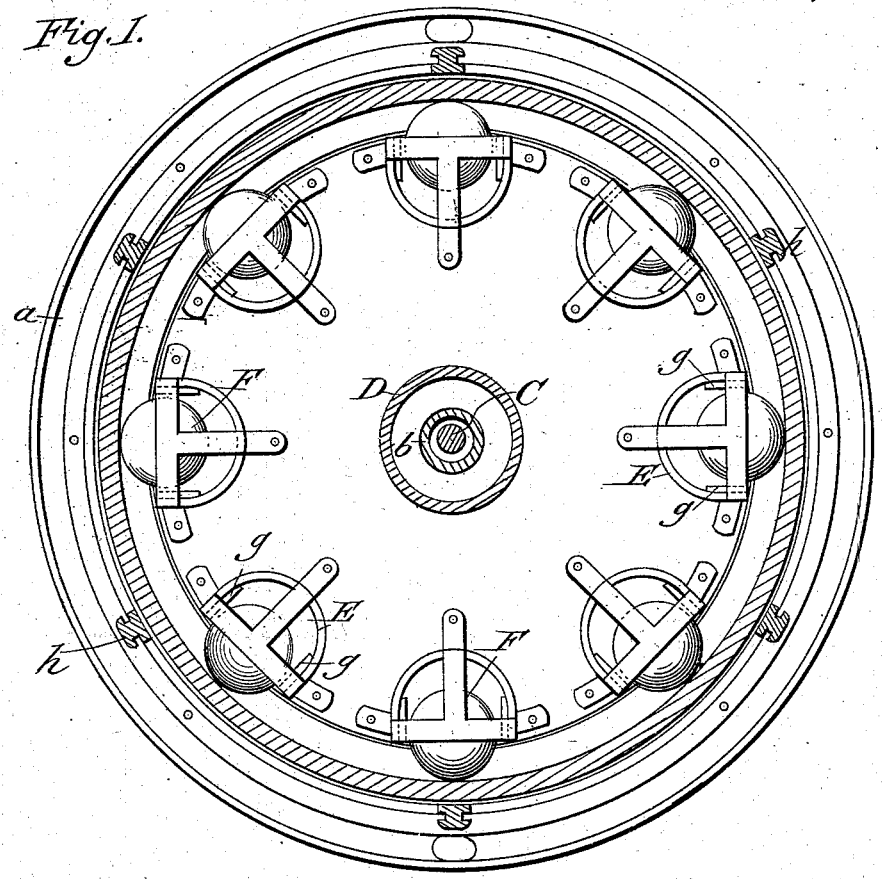
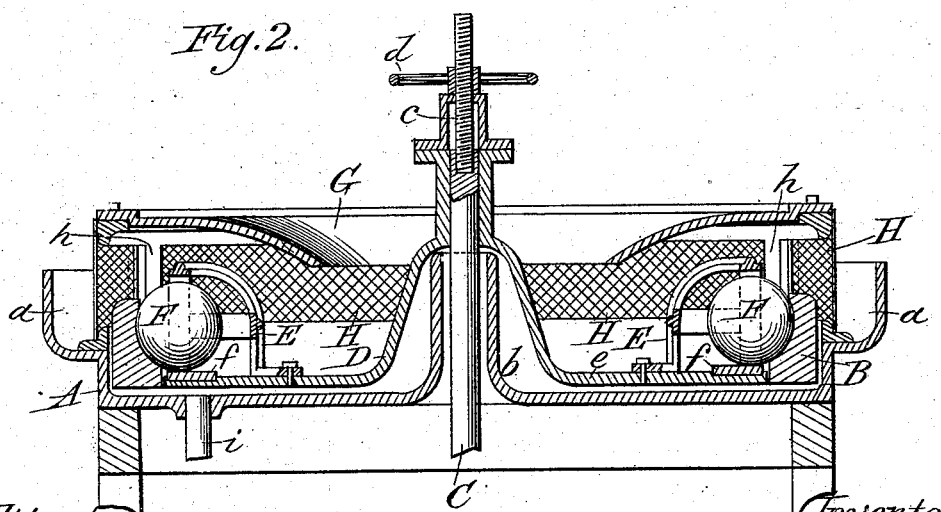
Attest:
F. H. Schott
A. R. Brown.
Inventor:
Franklin Morey
J. C. Tasker atty

UNITED STATES PATENT OFFICE.

FRANKLIN MOREY, OF BROOKLYN, NEW YORK, ASSIGNOR TO OSCAR W. TURNER, OF OAK PARK, ILLINOIS.

ORE-CRUSHING MACHINE.

SPECIFICATION forming part of Letters Patent No. 274,215, dated March 20, 1883.

Application filed November 24, 1882. (No model.)

*To all whom it may concern:*

Be it known that I, FRANKLIN MOREY, a citizen of the United States, residing at Brooklyn, in the county of Kings and State of New York, have invented certain new and useful Improvements in Ore-Crushing Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improved machine for crushing and pulverizing ore; and it consists in the construction, arrangement, and combination of parts, as hereinafter more fully described and claimed.

In the annexed drawings, illustrating the invention, Figure 1 is a plan view of my improved ore-crushing machine in horizontal section. Fig. 2 is a central vertical section.

Like letters indicate like parts.

The letter A designates a shallow pan having an upwardly-flanged or trough-like extension, $a$, on its periphery. B is an annular die, concave in cross-section and arranged within the pan, as shown in Fig. 2. The pan A is formed with a central hub, $b$, through which passes a vertical shaft, C, that drives the muller D, a screw-shaft, $c$, and hand-wheel $d$ being provided for adjusting the muller vertically, so that it can be lowered upon and within the pan or be raised clear of the bottom of the pan. The muller D is made with a horizontal portion, $e$, to which are bolted at intervals a series of cages, E, within which are placed the balls, globes, or spherical masses of iron, F, that are confined loosely within said cages, so as to exert a crushing or pulverizing action upon the ore introduced into the pan between said balls and the annular die, the balls F being actuated by the centrifugal force exerted by the rotation of the muller. The balls F rest upon an annular plate, $f$, formed of steel and let into the outer portion of the muller, as shown in Fig. 2, the muller being thus protected from the wearing action of the crushing-balls F, and the inner sides of the cages E are likewise protected by steel plates $g$, as shown in Fig. 1. The pan A is provided with standards forming a part of a frame that supports a concaved cover, G, which is provided with a central opening for the introduction of ore to the pan, and through which also passes the vertical shaft for actuating the muller. These standards also support the screen or screens H, through which the pulp escapes to the trough $a$, whence it is run off through suitable openings as desired.

The operation of the machine will be readily understood. When the muller is rotated the ore introduced into the pan will be thrown outward by centrifugal force and become crushed or pulverized between the balls F F and die B, the inner surface of which is concaved to correspond with the convexity of said balls. When water is used it is introduced through a pipe, $i$, beneath the muller, which is thus buoyed up, so as to prevent the ore from getting below said muller, the water, ore, and pulp being thrown outward by centrifugal force, so that as fast as the ore is ground to the proper degree of fineness it will pass through the screens and into the trough on the outside of the pan. If desired, the inner face of the pan adjacent to the die may be amalgamated, so as to arrest and hold any free particles of gold contained in the pulp.

It will be observed that by arranging crushing-balls or globular masses of iron or similar material within cages attached to the rotating muller, said balls being adapted to work upon and crush any ore thrown against the concaved face of the annular die, the ore will be thoroughly and expeditiously crushed or pulverized, while the muller is protected from liability of becoming rapidly worn.

The machine may be used for either wet or dry crushing. When employed for dry crushing, the top and sides of the machine are inclosed by suitable means, the pulp being forced or carried out by a current of air underneath in place of the water, or by suction. When water is used it will be carried around behind the die in the space between the die and the sides of the pan, thus causing the pulp to be worked off easily.

It is obvious that the cages E may be attached to the muller by any suitable means. These cages carry the balls F around horizontally at the same time that the balls are acted upon by the centrifugal motion of the muller. The cages thus prevent loss of motion and of action by reason of the balls being thrown against the die—that is, they prevent the balls from flying back to the center, the space within the cages being sufficient to admit of proper action of the balls.

Having thus described my invention, what I claim as new, and desire to secure by Letters Patent, is—

1. The combination of the pan A, having an annular concaved die, B, the muller D, having cages E E and an annular metallic plate, $f$, and the balls F, confined loosely within said cages, substantially as shown and described.

2. The combination of the pan A, annular concaved die B, muller D, having annular plate $f$, cages E E, provided with internal plates, $g\ g$, and the balls F F, substantially as shown and described.

3. The herein-described apparatus for crushing or pulverizing ores, consisting of the pan A, having an external annular trough, $a$, concaved annular die B, vertical screens H, the muller D, provided with cages E and annular plate $f$, the balls F, placed within said cages, means for imparting a vertical adjustment to the muller, and means for rotating said muller in a horizontal plane, substantially as shown and described.

In testimony whereof I affix my signature in presence of two witnesses.

FRANKLIN MOREY.

Witnesses:
O. E. BRANCH,
JOHN L. BRANCH.